United States Patent
Massal

(10) Patent No.: US 9,796,471 B2
(45) Date of Patent: Oct. 24, 2017

(54) SET OF SWASHPLATES FOR CONTROLLING THE PITCH OF ROTOR BLADES, A ROTOR AND AN AIRCRAFT HAVING SUCH A SET

(71) Applicant: AIRBUS HELICOPTERS, Marignane (FR)

(72) Inventor: Fabien Massal, Saint Chamas (FR)

(73) Assignee: AIRBUS HELICOPTERS, Marignane (FR)

(*) Notice: Subject to any disclaimer, the term of this patent is extended or adjusted under 35 U.S.C. 154(b) by 480 days.

(21) Appl. No.: 14/687,039

(22) Filed: Apr. 15, 2015

(65) Prior Publication Data
US 2015/0307189 A1   Oct. 29, 2015

(30) Foreign Application Priority Data

Apr. 25, 2014  (FR) .................................. 14 00982

(51) Int. Cl.
*B64C 27/605* (2006.01)

(52) U.S. Cl.
CPC ........ *B64C 27/605* (2013.01); *F05D 2250/42* (2013.01)

(58) Field of Classification Search
CPC .......................... B64C 27/605; B64C 27/7255
USPC ............................................. 416/114, 134 A
See application file for complete search history.

(56) References Cited

U.S. PATENT DOCUMENTS

| | | | |
|---|---|---|---|
| 5,067,875 A * | 11/1991 | Hunter | B64C 27/605 416/114 |
| 6,033,182 A | 3/2000 | Rampal | |
| 6,231,005 B1 * | 5/2001 | Costes | B64C 27/605 244/17.25 |
| 6,280,141 B1 | 8/2001 | Rampal et al. | |
| 7,021,897 B2 * | 4/2006 | Scala | B64C 27/605 416/114 |

(Continued)

FOREIGN PATENT DOCUMENTS

| | | |
|---|---|---|
| EP | 2679493 | 1/2014 |
| FR | 2768996 | 4/1999 |
| FR | 2768997 | 4/1999 |

(Continued)

OTHER PUBLICATIONS

English translation of Written Opinion from French Office.*
French Search Report for FR 1400982, Completed by the French Patent Office dated Dec. 4, 2014. 7 Pages.

*Primary Examiner* — Woody Lee, Jr.
*Assistant Examiner* — Topaz L Elliott
(74) *Attorney, Agent, or Firm* — Brooks Kushman P.C.

(57) ABSTRACT

A set of swashplates having a non-rotary swashplate and a rotary swashplate. The set includes drive means constraining the rotary swashplate and the rotor mast in rotation about the axis of rotation. The drive means are provided with a drive arm driving the rotary swashplate in rotation about the axis of rotation by plane connection means including a fork, the drive arm extending in elevation from a first end to a second end that is fastened to the rotor mast, the first portion being held captive laterally between two lateral branches of the fork, the fork being hinged to the rotary swashplate by movement means giving the rotary swashplate a degree of freedom to move in rotation about a radial direction of the rotary swashplate relative to the fork.

20 Claims, 4 Drawing Sheets

(56) References Cited

U.S. PATENT DOCUMENTS 8,840,372 B2    9/2014  Girard

FOREIGN PATENT DOCUMENTS

| FR | 2848524 A1 * | 6/2004 | ........... B64C 27/605 |
| FR | 2951699 | 4/2011 | |

* cited by examiner

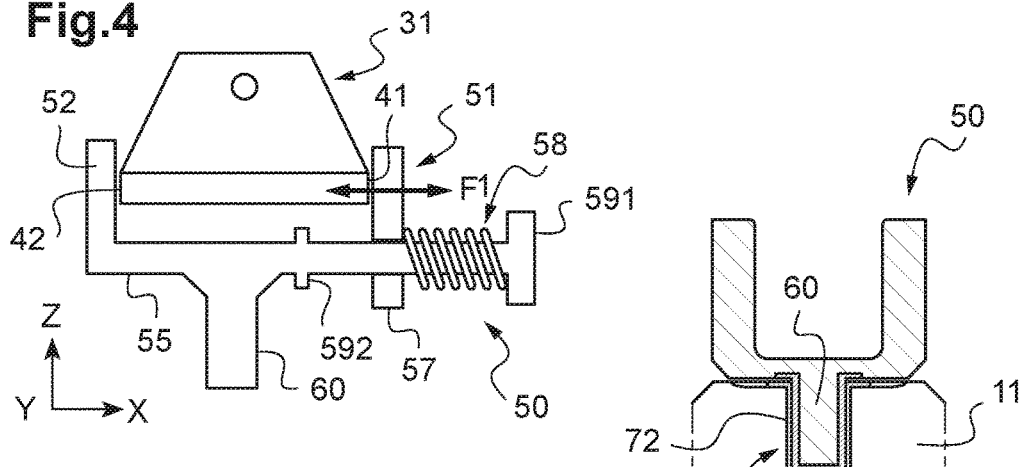
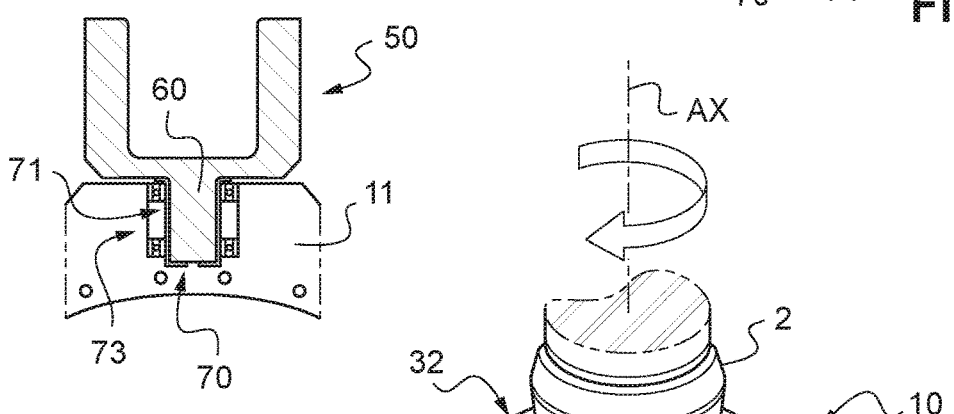
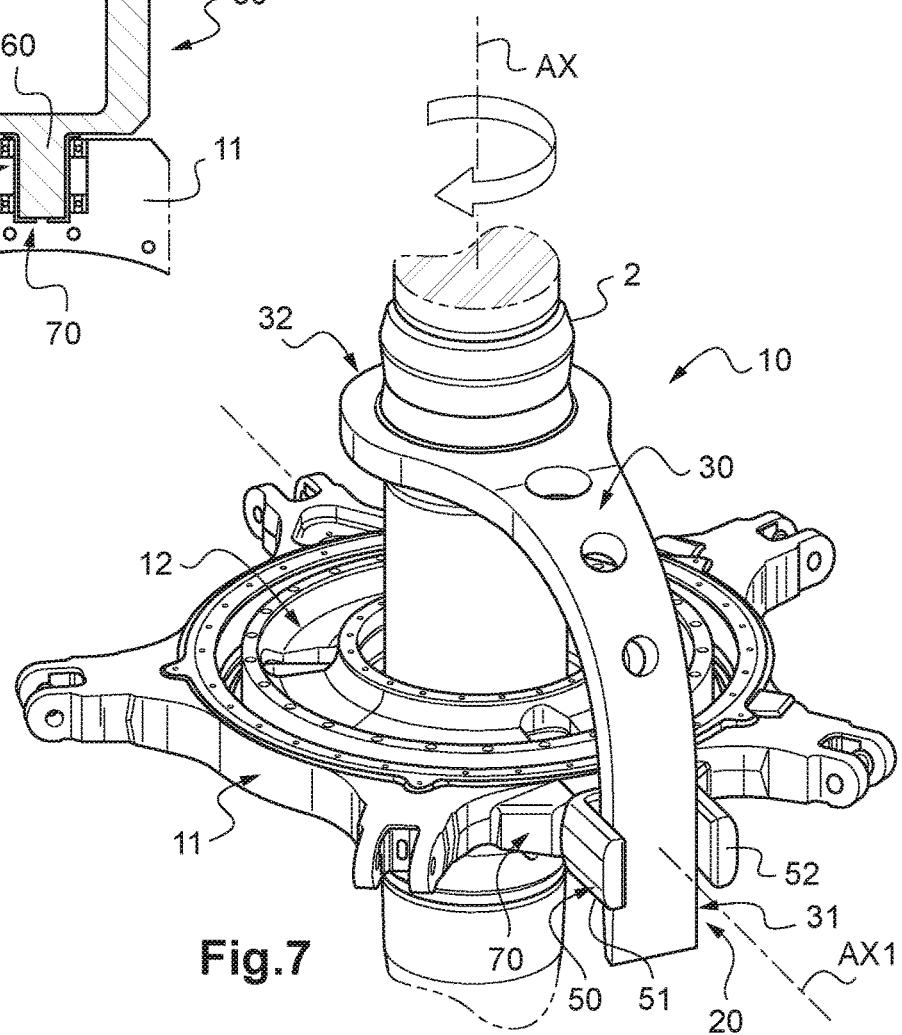

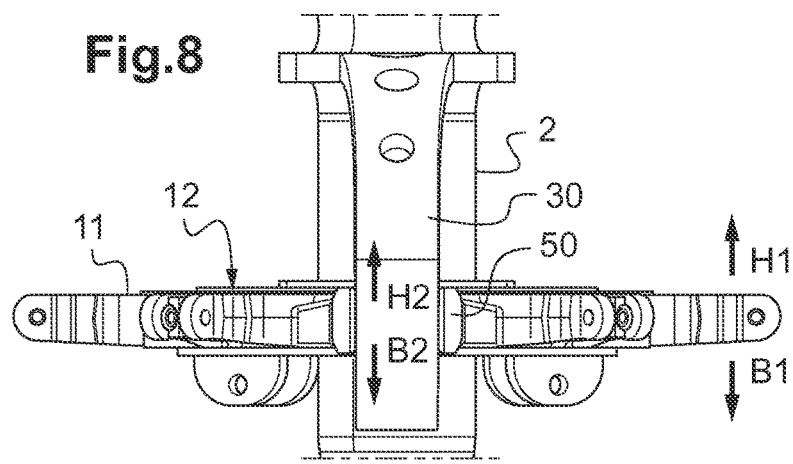
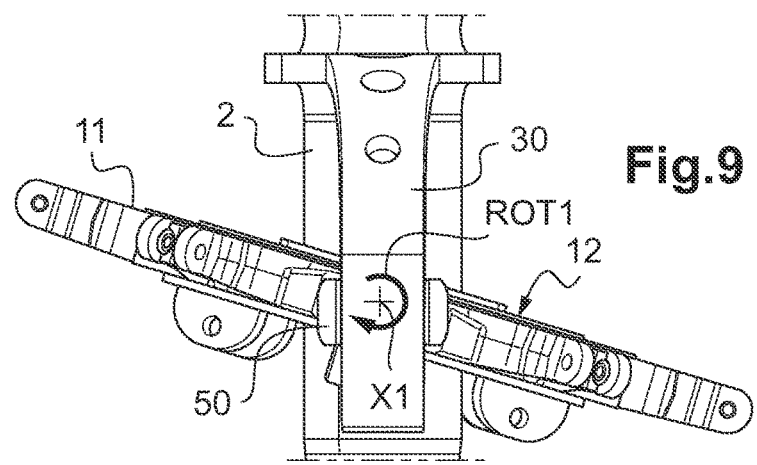
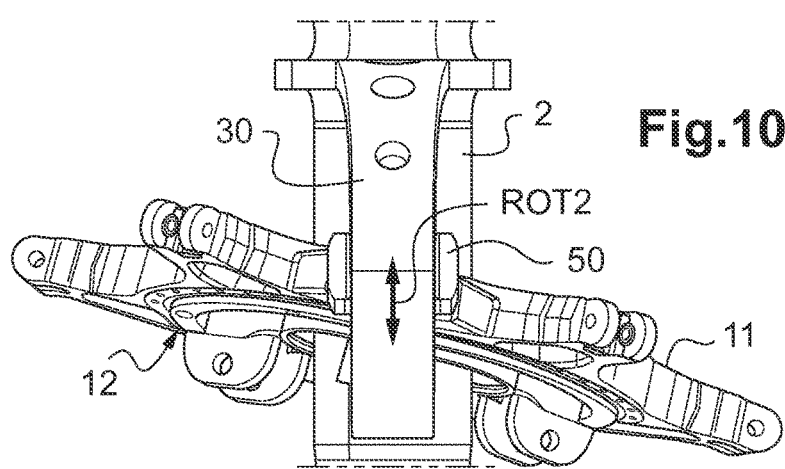

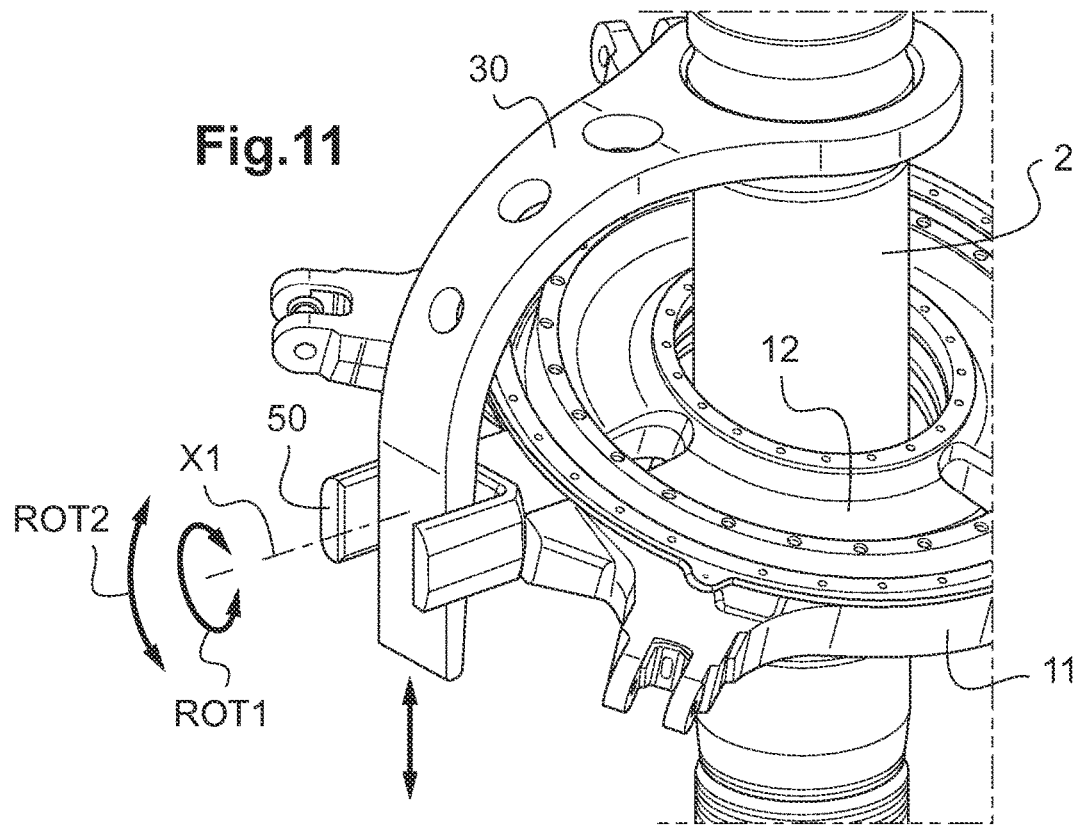

SET OF SWASHPLATES FOR CONTROLLING THE PITCH OF ROTOR BLADES, A ROTOR AND AN AIRCRAFT HAVING SUCH A SET

CROSS REFERENCE TO RELATED APPLICATION

This application claims priority to French patent application No. FR 14 00982 filed on Apr. 25, 2014, the disclosure of which is incorporated in its entirety by reference herein.

BACKGROUND OF THE INVENTION (1) Field of the Invention

The present invention relates to a set of swashplates for controlling the pitch of rotor blades, and to a rotor and to an aircraft having such a set.

(2) Description of Related Art

A main rotor of a rotorcraft serves to provide the rotorcraft with lift and possibly also propulsion. Conventionally, such a main rotor comprises a rotor mast that rotates a plurality of blades via a rotor hub.

In order to control the movement of the rotorcraft, the pitch of the blades of the main rotor is controlled by a pilot.

Cyclic variation of the pitch of the blades serves to vary the pitch of each blade as a function of its azimuth angle. In contrast, collective variation of the pitch of the blades causes an identical variation in the pitch of all of the blades.

Under such circumstances, the pitch of the blades can be adjusted by means of pitch rods and by means of a set of swashplates surrounding the rotor mast.

In principle, the set of swashplates comprises a rotary swashplate connected to the pitch rods and a non-rotary swashplate connected to the flight controls.

The non-rotary swashplate is situated under the rotary swashplate or is surrounded by the rotary swashplate. Furthermore, the non-rotary swashplate is connected to the rotary swashplate in order to impart its movements to the rotary swashplate. Thus, the rotary swashplate follows all of the movements of the non-rotary swashplate and transmits those movements to the blades via the pitch rods.

Consequently, the non-rotary and rotary swashplates are suitable for being moved in translation along the rotor mast and they are also suitable for being tilted relative to the rotor mast, e.g. with the help of a plurality of servo-controls connected to the structure of the rotorcraft and to the non-rotary swashplate. As a general rule, the movements in translation and in tilting of the non-rotary and rotary swashplates are implemented with the help of a device including a mast ball joint centered on the axis of rotation of the rotor and slidable along a stationary structural element surrounding said rotor mast.

The non-rotary swashplate is then arranged in oscillating manner on the mast ball joint so as to be capable of being tilted and of being moved in translation relative to the rotor mast.

Furthermore, the non-rotary swashplate is secured to the structure of the rotorcraft with the help of at least one stationary scissors linkage that consequently prevents it from rotating about the axis of rotation of the rotor.

The rotary swashplate of the set of swashplates is then connected to the non-rotary swashplate by a member making the following possible:

the rotary swashplate can be constrained together with the non-rotary swashplate to move in translation along the rotor mast;

the rotary swashplate can oscillate about the mast ball joint together with the non-rotary swashplate; and the rotary swashplate can rotate about the axis of rotation of the rotor together with the blades.

To this end, the rotary swashplate is provided with at least one rotary scissors linkage connected to the rotor mast, possibly via the hub of the main rotor. The rotor mast then acts either directly or indirectly to drive the rotary swashplate in rotation about the axis of rotation.

A scissors linkage, whether rotary or non-rotary, generally comprises two arms that are hinged together. More precisely, each scissors linkage comprises a primary arm and a secondary arm that are hinged together by a first hinge. The first hinge allows the two arms of a scissors linkage to move apart or towards each other so as to allow the swashplate connected to the scissors linkage to move in translation.

The primary arm is also connected via a second hinge to the rotor mast or to the structure of the rotorcraft, as appropriate, while the secondary arm is connected to the corresponding swashplate via a third hinge.

Although effective, said first, second, and third hinges are subject to wear requiring maintenance actions that are onerous and frequent.

In order to remedy that, scissors linkages are often over-dimensioned, and are therefore heavy and expensive to fabricate.

Furthermore, scissors linkages are large in size because of the movements they need to perform. Such large size can generate aerodynamic disturbances.

Thus, Document FR 2 768 996 seeks to replace the rotary scissors linkage by means that are lightweight, that are inexpensive to fabricate, and that generate less aerodynamic drag.

The set of swashplates then has drive means as an alternative to the rotary scissors linkage and provided with two rigid arms that are diametrically opposite, each rigid arm being secured both to the rotor mast and to the rotary swashplate via point connection means.

More precisely, each arm is provided with a U-shaped section defining a rigid drive track in which a finger of the rotary swashplate is received. In combination, the finger and the rigid track then constitute the point connection means.

In order to co-operate with the rigid drive track, the finger includes a wheel, a pair of wheels, a sliding skid, or indeed a sliding skid and a wheel, depending on the variant.

Document FR 2 951 699 describes a set of swashplates. That set includes drive means provided with a drive arm and annular linear connection means secured to a rotary swashplate rotatable about an axis of rotation. A first end of the drive arm is connected to the rotary swashplate by the annular linear connection means and a second end of the drive arm is connected to a rotor mast by slideway connection means of the drive means.

Also known is Document EP 2 679 493.

BRIEF SUMMARY OF THE INVENTION

The present invention seeks to propose a set of swashplates provided with drive means that are relatively simple and robust.

According to the invention, a set of swashplates is for controlling the pitch of rotor blades, the set being provided with a non-rotary swashplate held against any rotation about an axis of rotation, and a rotary swashplate suitable for rotating about the axis of rotation.

The set of swashplates includes drive means for constraining the rotary swashplate and a rotor mast of the rotor in rotation about the axis of rotation. The drive means are provided with a drive arm driving the rotary swashplate in rotation about the axis of rotation via plane connection means including a fork, the drive arm extending in elevation from a first end towards a second end that is to be fastened to a rotor mast, the first end being held captive laterally between two lateral branches of the fork, the fork being hinged to the rotary swashplate by movement means that impart to the rotary swashplate a degree of freedom in rotation about a radial direction of the rotary swashplate relative to said fork.

The invention thus consists in replacing a conventional rotary scissors linkage with a drive device including a drive arm and a fork. The drive arm is a non-deformable arm fastened to the rotor mast. This drive arm does not fold and does not have hinges, it is not hinged to the rotor mast and it is not hinged to any other member. However, the drive arm does pass through a fork, which fork is free to pivot about a radial direction relative to the rotary swashplate, regardless of the relative position between the rotary swashplate and the arm.

Under such circumstances, the first end of the arm is arranged in a space that is defined at least in part by the fork. The fork and the rotary swashplate can then move in translation relative to the drive arm, both in a radial direction and in a direction in elevation.

Furthermore, the rotary swashplate can pivot relative to the fork about the radial direction.

The fork thus presents the characteristics of a plane connection.

Furthermore, the drive arm is held laterally between two branches of the fork. The drive arm can in particular extend laterally from a first edge face to a second edge face. This lateral extent takes place in a direction referred to for convenience as a "tangential" direction relative to the cylinder as described by the first end of the drive arm under drive from the rotor mast. The first edge face is then in contact with a first branch of the fork, the second edge face being in contact with a second branch of the fork.

Consequently, rotation of the drive arm about the axis of rotation of the device gives rise to identical rotation of the rotary swashplate. When the drive arm is set into rotation about the axis of rotation by the rotor mast, an edge face of the drive arm exerts a force against one of the branches of the fork so as to set the fork into rotation together with the rotary swashplate about the axis of rotation.

In addition, as a result of an order to change the pitch of the blades of the rotor cyclically or collectively, the rotary swashplate can oscillate or move in translation.

The movement of the rotary swashplate can then cause the rotary swashplate to turn relative to the fork and/or can cause the fork to move in a plane containing the drive arm and the axis of rotation.

Under such circumstances, the fork and the drive arm do not impede movement in oscillation and translation of the rotary swashplate as a result of a movement order given to the set of swashplates.

The drive device is thus suitable for replacing a conventional rotary scissors linkage.

Furthermore, the drive device presents the advantage of using two mechanical parts that are relatively simple and that are found to be inexpensive, unlike devices that present complex mechanical connections.

Furthermore, the system is relatively simple to mount. Such mounting comprises a step of fastening the fork to the rotary swashplate and a step of engaging the drive arm in the fork.

Furthermore, the device can avoid presenting the problems of jamming or wear that are to be observed in certain scissors linkages, given that there is no hinge between the drive arm and the fork.

The set of swashplates may also include one or more of the following characteristics.

By way of example, the fork is U-shaped, having an end wall carrying the two branches, the end wall being connected by the movement means to the rotary swashplate.

The fork is thus simple to fabricate.

Furthermore, the movement means may comprise a pivot shaft secured to the end wall, the pivot shaft penetrating into a reception orifice of the rotary swashplate.

Consequently, the movement means may optionally comprise a shouldered ring or a bearing system interposed between the pivot shaft and the rotary swashplate.

The invention thus uses a drive arm and a U-shaped fork, the fork being extended by a pivot shaft. Consequently, the device for driving the rotary swashplate in rotation does not have any complex hinges.

Furthermore, at least one of said branches may have an inside surface provided with slide means for facilitating movement in translation of said fork along said arm.

The slide means tend to minimize any risk of jamming.

The slide means may include a layer of material applied to the fork in order to encourage sliding, such as a layer including TEFLON® polytetrafluoroethylene (PTFE), for example.

In a variant, the slide means may comprise at least one roller carried by at least one branch.

Furthermore, at least one of said two branches may comprise a movable wall movable relative to the other branch forming a movable stop to enable the drive arm to be continuously clamped in the fork between said branches.

The movable wall seeks to guarantee that there is no clearance between the drive arm and the branches of the fork in a tangential direction. This characteristic serves to optimize rotary drive of the fork and of the rotary swashplate by the drive arm without any risk of major wear or jamming.

For example, the fork has an end wall connected to the rotary swashplate, at least one of the branches of the fork including a movable wall that is slidable laterally along the end wall.

Furthermore, the fork may include a spring member interposed between the movable wall and a shoulder of the end wall in order to move the movable wall against an edge face of the drive arm.

In addition, said drive arm may include in elevation a first end portion that is substantially vertical, forming said first end, followed by a rounded intermediate portion having a radius of curvature, and a second end portion that is substantially horizontal and forming the second end, the second portion comprising a ring for engaging around a rotor mast.

The intermediate portion may present slots to reduce the weight of the drive arm.

Furthermore, the drive arm may include a first end portion forming said first end, the first end portion extending transversely from a first edge face towards a second edge face over a width that is constant between the branches of the fork.

This characteristic makes it easier to move the fork along the drive arm.

In addition to a set of swashplates, the invention provides a rotorcraft rotor provided with a rotor mast driving a plurality of blades in rotation about an axis of rotation, the rotor having a set of swashplates for controlling the pitch of the blades, which set comprises a non-rotary swashplate held against any rotation about the axis of rotation and a rotary swashplate suitable for rotating about the axis of rotation, the set of swashplates including drive means constraining the rotary swashplate and the rotor mast in rotation about the axis of rotation.

The set of swashplates is then a set of the above-described type, the second end of the drive arm being secured to the rotor mast.

The invention also provides an aircraft including such a rotor.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a view of an aircraft presenting a rotor of the invention;

FIG. 2 is view of a drive arm;

FIG. 3 is a view of a fork;

FIG. 4 is section view of a fork having a movable wall;

FIG. 5 is a view of movement means having a shouldered ring;

FIG. 6 is a view of movement means having a ball bearing system;

FIG. 7 is a three-dimensional view of a set of swashplates; and

FIGS. 8 to 11 are views explaining the operation of the set of swashplates.

Elements present in more than one of the figures are given the same references in each of them.

DETAILED DESCRIPTION OF THE INVENTION

It should be observed that three mutually orthogonal directions X, Y, and Z are shown in some of the figures.

The first direction X and second direction Y are said to be radial.

The first direction X and the second direction Y together define a horizontal plane perpendicular to a direction in elevation Z.

Figures 1, 2, 3:
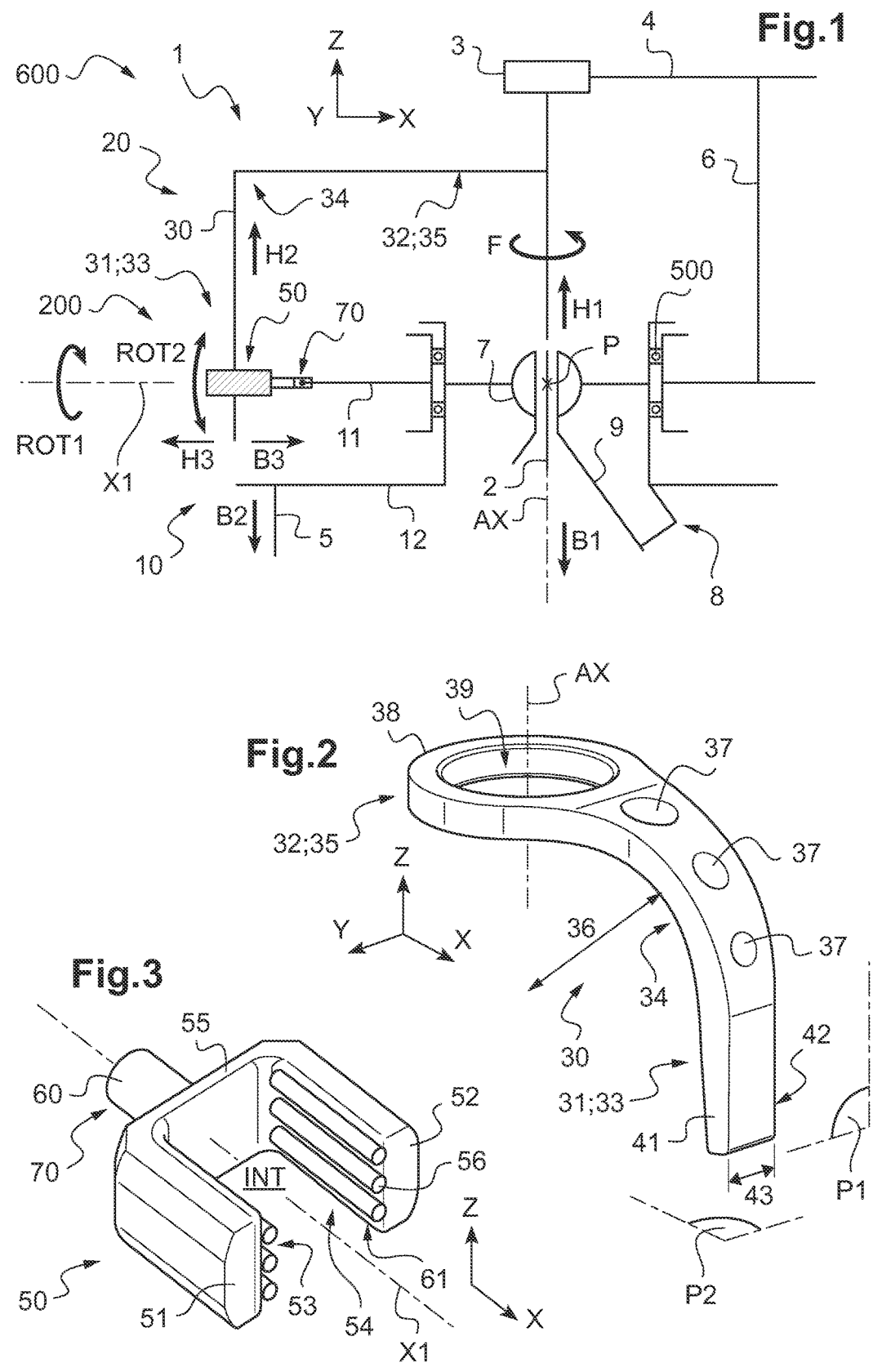

FIG. 1 is a diagrammatic view of an aircraft 600 having a rotor 1, e.g. a rotor providing the aircraft 600 with at least some of its propulsion and/or lift. The other members of the aircraft are not shown in order to avoid overcrowding FIG. 1.

The rotor 1 has a rotor mast 2 extending in elevation along an axis of rotation AX. The rotor mast 2 is constrained to rotate with a hub 3 carrying a plurality of blades 4.

The rotor 1 is provided with a set 10 of swashplates that is connected to flight controls by servo-controls 5, for example.

More precisely, the set 10 of swashplates has a non-rotary swashplate 12 arranged on a mast ball joint 7 and capable of sliding on a stationary element 9 of the structure of the rotorcraft. The non-rotary swashplate 12 is also connected to the stationary element 9 via a non-rotary scissors linkage 8. The non-rotary scissors linkage thus holds the non-rotary swashplate against any rotation about the axis of rotation AX.

It is possible to envisage using other means for retaining the non-rotary swashplate relative to the element 9 without going beyond the ambit of the invention. For example, it is possible to use the retaining means described in Document FR 2 768 997.

Furthermore, the set 10 of swashplates has a rotary swashplate 11 fastened to the non-rotary swashplate 12 by a fastener system 500 that nevertheless allows the rotary swashplate 11 to rotate about the axis of rotation AX relative to the non-rotary swashplate 12.

The rotary and non-rotary swashplates 11 and 12 are concentric, for example. The non-rotary swashplate 12 is then arranged within a circular orifice in the rotary swashplate.

Reference may be made to the literature to obtain more information about the arrangement and the operation of non-rotary and rotary swashplates 12 and 11 in a set 10 of swashplates. Reference may also be made to Document FR 2 848 524, which describes a connection between the rotary swashplate and the stationary swashplate.

Under such circumstances, the non-rotary swashplate 12 is connected to the flight controls by servo-controls 5 while the rotary swashplate is connected to each of the blades by a respective pitch control rod 6.

When the pitch controls require collective variation in the pitch of the blades, the servo-controls act on the non-rotary swashplate 12 so as to move the non-rotary and the rotary swashplates 12 and 11 together in translation along the axis of rotation AX. In contrast, if the pitch controls require cyclic variation of pitch, then the non-rotary and rotary swashplates 12 and 11 are tilted jointly about a point P corresponding to the center of the mast ball joint 7.

Furthermore, the set 10 of swashplates possesses drive means 20 connecting the rotary swashplate 11 to the rotor mast 2. The drive means 20 cause the rotary swashplate to be driven by the rotor mast 2 about the axis of rotation AX.

According to the invention, the drive means 20 comprise a drive arm 30.

A first end 31 of this drive arm 30 is connected to the rotary swashplate 11 by plane connection means 200, while a second end 32 of the drive arm 30 is secured to the rotor mast 2.

FIG. 2 shows a drive arm 30.

The drive arm 30 comprises in succession in elevation: a first end portion 33 defining the first end 31; an intermediate portion 34; and then a second end portion 35.

The first end portion extends in a first plane P1 that is substantially vertical. This first plane P1 is firstly substantially perpendicular to a horizontal second plane P2 that is orthogonal to the axis of rotation AX, and secondly substantially parallel to the axis of rotation AX.

This first end portion 33 also extends tangentially from a first edge face 41 to a second edge face 42 over a width 43. This width 43 is advantageously constant in the first end portion 33.

The second end portion 35 presents a ring 38 arranged in a third plane that is substantially horizontal, the axis of rotation AX representing an axis of symmetry for the ring 38. The ring 38 defines a central orifice 39 through which a rotor mast can pass. Under such circumstances, the ring 38 may be secured to the rotor mast by conventional means.

The intermediate portion 34 extends between the ring 38 and the first end portion 33. By way of example, this intermediate portion 34 is rounded and presents a radius of curvature 36 that is relatively large.

Furthermore, the intermediate portion 34 may have slots 37 in order to reduce its weight.

With reference to FIG. 1, plane connection means 200 co-operating with such a drive arm 30 comprise a fork 50.

The fork 50 is hinged to a periphery of the rotary swashplate 11 by movement means 70. In addition, the first end 31 of the drive arm penetrates into an inside space of the fork 50 that is defined by two branches of the fork.

With reference to FIG. 3, the fork may have two branches 51 and 52 that are parallel to each other in order to define an internal space INT for receiving the drive arm. Each branch may for example be parallel to a radial direction X1.

Under such circumstances, the fork may in particular be U-shaped, possessing an end wall 55 carrying a branch 51 referred to as a "first" branch and another branch 52 referred to as a "second" branch.

The first branch 51 and the second branch 52 are for placing respectively against a first edge face 41 and a second edge face 42 of the drive arm 30.

Nevertheless, in order to enable the fork 50 to slide around the drive arm 30, slide means 61 may be arranged on at least one of the inside surfaces 53, 54 of the branches.

Such slide means may comprise at least one roller 56.

By way of example, each branch 51, 52 of the fork 50 has an inside surface carrying at least one roller suitable for rolling along a branch of the drive arm.

In addition, and with reference to FIG. 4, at least one of the two branches 51, 52 of the fork is embodied by a movable wall 57. This wall is said to be movable insofar as the wall can be moved along a lateral direction as represented by double-headed arrow F1.

Each movable wall thus forms a movable stop pressed against an edge face of the drive arm so as to enable the drive arm 30 to be continuously clamped in the fork 50 between the two branches 51 and 52.

Such a movable wall 57 can then slide tangentially along the end wall 55 of the fork. The term "tangentially" should be considered relative to the circle described by the first end as it rotates about the axis of rotation AX of the rotor.

Furthermore, a spring member 58 may extend between the movable wall 57 and a first shoulder 591 of the end wall 55. This spring member then exerts a force on the movable wall in order to press it against the edge face of the drive arm. The spring member may possibly comprise a spring as such, or else a block of elastomer material, for example.

Finally, the end wall 55 is optionally provided with a second shoulder 592 for limiting the travel range of the movable wall.

With reference of FIG. 3, the end wall 55 of the fork is hinged to the rotary swashplate by movement means 70.

The movement means 70 are optionally provided with a pivot shaft 60 extending in a radial direction X1. Furthermore, this pivot shaft 60 is secured to the end wall 55.

The unit comprising the pivot shaft and the fork may constitute a single one-piece mechanical part, for example.

With reference to FIGS. 5 and 6, the pivot shaft is inserted in a reception orifice 71 of the rotary swashplate.

The term "reception orifice 71 of the rotary swashplate" designates an orifice constrained to move with the rotary swashplate. For example, the rotary swashplate may comprise a single swashplate presenting said reception orifice. Nevertheless, the rotary swashplate could equally well comprise a plurality of members, such as a swashplate with a projection secured to the swashplate, it then being possible for the reception orifice to be made in such a projection.

Furthermore, and as in the embodiment of FIG. 5, the movement means 70 comprise a shouldered ring 72 that is arranged between the rotary swashplate 11 and the pivot shaft 60 in the reception orifice 71.

In the embodiment of FIG. 6, the movement means 70 comprises a ball bearing system 73 that is arranged between the rotary swashplate 11 and the pivot shaft 60 in the reception orifice 71.

FIG. 7 is a three-dimensional view of a set 10 of swashplates.

FIGS. 8 to 11 show the operation of this set 10 of swashplates.

It should be observed that for reasons of clarity, FIGS. 7 to 11 do not show the mast ball joint carrying the non-rotary swashplate 12.

With reference to FIG. 8, when the servo-controls 5 request movement in translation of the non-rotary and rotary swashplates 12 and 11 in an upward direction along arrow H1 or in a downward direction along arrow B1, the fork slides along arrows H2 and B2 along the first end portion 31 of the drive arm. This movement of the fork in translation in elevation takes place regardless of the angle of inclination of the plane of the rotary swashplate relative to the axis of rotation AX.

Furthermore, and with reference to FIG. 9, if the servo-controls request the non-rotary and rotary swashplates 12 and 11 to tilt about the center of the mast ball joint 7, then the plane connection means can allow the rotary swashplate to perform first rotation ROT1 about the radial direction AX1 relative to the fork.

In alternative manner and as shown in FIG. 10, the plane connection means may allow the fork and the rotary swashplate 11 to perform second rotation ROT2 about the center of the mast ball joint 7.

With reference to FIG. 1, such a second rotation ROT2 gives rise to movement in translation in elevation along arrows H2 and B2 and to movement in radial translation along arrows H3 and B3 of the fork relative to the arm.

With reference to FIG. 11, if the servo-controls require the non-rotary and rotary swashplates 12 and 11 to tilt about the center of the mast ball joint 7, the plane connection means can allow the rotary swashplate to perform first rotation ROT1 about the radial direction X1 relative to the fork and can allow second rotation ROT2 of the fork and of the rotary swashplate 11 about the center of the mast ball joint 7.

Consequently, the drive device does not impede the system for controlling the pitch of the blades 4 regardless of the movement order given to the set of swashplates.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A set of swashplates for controlling the pitch of blades of a rotor, the set being provided with a non-rotary swashplate held against any rotation about an axis of rotation and a rotary swashplate suitable for rotating about the axis of rotation, the set including drive means for constraining the rotary swashplate and a rotor mast of the rotor in rotation about the axis of rotation, the drive means being provided with a drive arm driving rotation of the rotary swashplate about the axis of rotation, the drive arm extending in elevation from a first end towards a second end that is to be fastened to a rotor mast, wherein the drive arm drives rotation of the rotary swashplate about the axis of rotation by means of a plane connection including a fork, the first portion being held captive laterally between two lateral branches of the fork, the fork being hinged to the rotary swashplate giving the rotary swashplate a degree of freedom to move in rotation about a radial direction of the rotary swashplate relative to the fork, wherein the drive arm includes a first end portion that is substantially vertical, forming the first end, followed by a rounded intermediate portion having a radius, and a second end portion that is substantially horizontal and forming the second end, the second end portion comprising a ring for engaging around the rotor mast.

2. The set of swashplates according to claim 1, wherein the fork is U-shaped, having an end wall carrying the two branches, the end wall being connected to the rotary swashplate.

3. The set of swashplates according to claim 2, wherein the fork is hinged to the rotary swashplate by movement means comprising a pivot shaft secured to the end wall, the pivot shaft penetrating into a reception orifice of the rotary swashplate.

4. The set of swashplates according to claim 3, wherein the movement means further comprise a shouldered ring or a bearing system interposed between the pivot shaft and the rotary swashplate.

5. The set of swashplates according to claim 1, wherein at least one of the branches has an inside surface facilitating movement in translation of the fork along the drive arm.

6. The set of swashplates according to claim 5, wherein the inside surface of the at least one of the branches is provided with slide means comprising at least one roller carried by at least one branch for facilitating movement in translation of the fork along the drive arm.

7. The set of swashplates according to claim 1, wherein at least one of two branches comprises a movable wall that is movable relative to the other branch forming a movable stop to enable the drive arm to be continuously clamped in the fork between the branches.

8. The set of swashplates according to claim 1, wherein the fork includes an end wall connected to the rotary swashplate, at least one of the branches comprising a movable wall sliding laterally along the end wall.

9. The set of swashplates according to claim 8, wherein the fork includes a spring member interposed between the movable wall and a shoulder of the end wall in order to move the movable wall against an edge face of the drive arm.

10. The set of swashplates according to claim 1, wherein the first end portion of the drive arm extends transversely from a first edge face to a second edge face over a constant width between the branches.

11. A rotorcraft rotor provided with a rotor mast driving a plurality of blades in rotation about an axis of rotation, the rotor including a set of swashplates for controlling the pitch of the blades, the set of swashplates is comprising a non-rotary swashplate retained against any rotation about the axis of rotation and a rotary swashplate suitable for rotating about the axis of rotation, the set of swashplates including drive means constraining the rotary swashplate and the rotor mast in rotation about the axis of rotation, wherein the set of swashplates is a set according to claim 1, the second end of the drive arm being secured to the rotor mast.

12. An aircraft, wherein the aircraft includes a rotor according to claim 11.

13. A set of swashplates for controlling the pitch of blades of a rotor, the set being provided with a non-rotary swashplate held against any rotation about an axis of rotation and a rotary swashplate suitable for rotating about the axis of rotation, the set including drive means for constraining the rotary swashplate and rotor mast of the rotor in rotation about the axis of rotation, the drive means being provided with a drive arm driving rotation of the rotary swashplate about the axis of rotation, the drive arm extending in elevation from a first end towards a second end that is to be fastened to a rotor mast, wherein the drive arm drives rotation of the rotary swashplate about the axis of rotation by means of a plane connection including a fork, the first portion being held captive laterally between two lateral branches of the fork, the fork being hinged to the rotary swashplate giving the rotary swashplate a degree of freedom to move in rotation about a radial direction of the rotary swashplate relative to the fork, wherein at least one of the branches has an inside surface facilitating movement in translation of the fork along the drive arm.

14. The set of swashplates according to claim 13, wherein the inside surface of the at least one of the branches is provided with slide means comprising at least one roller carried by at least one branch for facilitating movement in translation of the fork along the drive arm.

15. The set of swashplates according to claim 14, wherein the fork is U-shaped, having an end wall carrying the two branches, the end wall being connected to the rotary swashplate.

16. The set of swashplates according to claim 15, wherein the fork is hinged to the rotary swashplate by movement means comprising a pivot shaft secured to the end wall, the pivot shaft penetrating into a reception orifice of the rotary swashplate.

17. The set of swashplates according to claim 16, wherein the movement means further comprise a shouldered ring or a bearing system interposed between the pivot shaft and the rotary swashplate.

18. The set of swashplates according to claim 15, wherein the drive arm includes a first end portion that is substantially vertical, forming the first end, followed by a rounded intermediate portion having a radius, and a second end portion that is substantially horizontal and forming the second end, the second end portion comprising a ring for engaging around the rotor mast.

19. The set of swashplates according to claim 13, wherein at least one of two branches comprises a movable wall that is movable relative to the other branch forming a movable stop to enable the drive arm to be continuously clamped in the fork between the branches.

20. A rotorcraft rotor provided with a rotor mast driving a plurality of blades in rotation about an axis of rotation, the rotor including a set of swashplates for controlling the pitch of the blades, the set of swashplates comprising a non-rotary swashplate retained against any rotation about the axis of rotation and a rotary swashplate suitable for rotating about the axis of rotation, the set of swashplates including drive means constraining the rotary swashplate and the rotor mast in rotation about the axis of rotation, the drive arm extending in elevation from a first end to a second end secured to the rotor mast, wherein the drive arm drives rotation of the rotary swashplate about the axis of rotation by a plane connection including a fork, the first portion being held captive laterally between two lateral branches of the fork, the fork being hinged to the rotary swashplate giving the rotary swashplate a degree of freedom to move in rotation about a radial direction of the rotary swashplate relative to the fork, wherein the drive arm includes a first end vertical portion forming the first end, followed by a rounded intermediate portion having a radius, and a second end horizontal portion forming the second end, the second end portion comprising a ring for engaging around at least a portion of the rotor mast.

* * * * *